United States Patent Office 3,091,836
Patented June 4, 1963

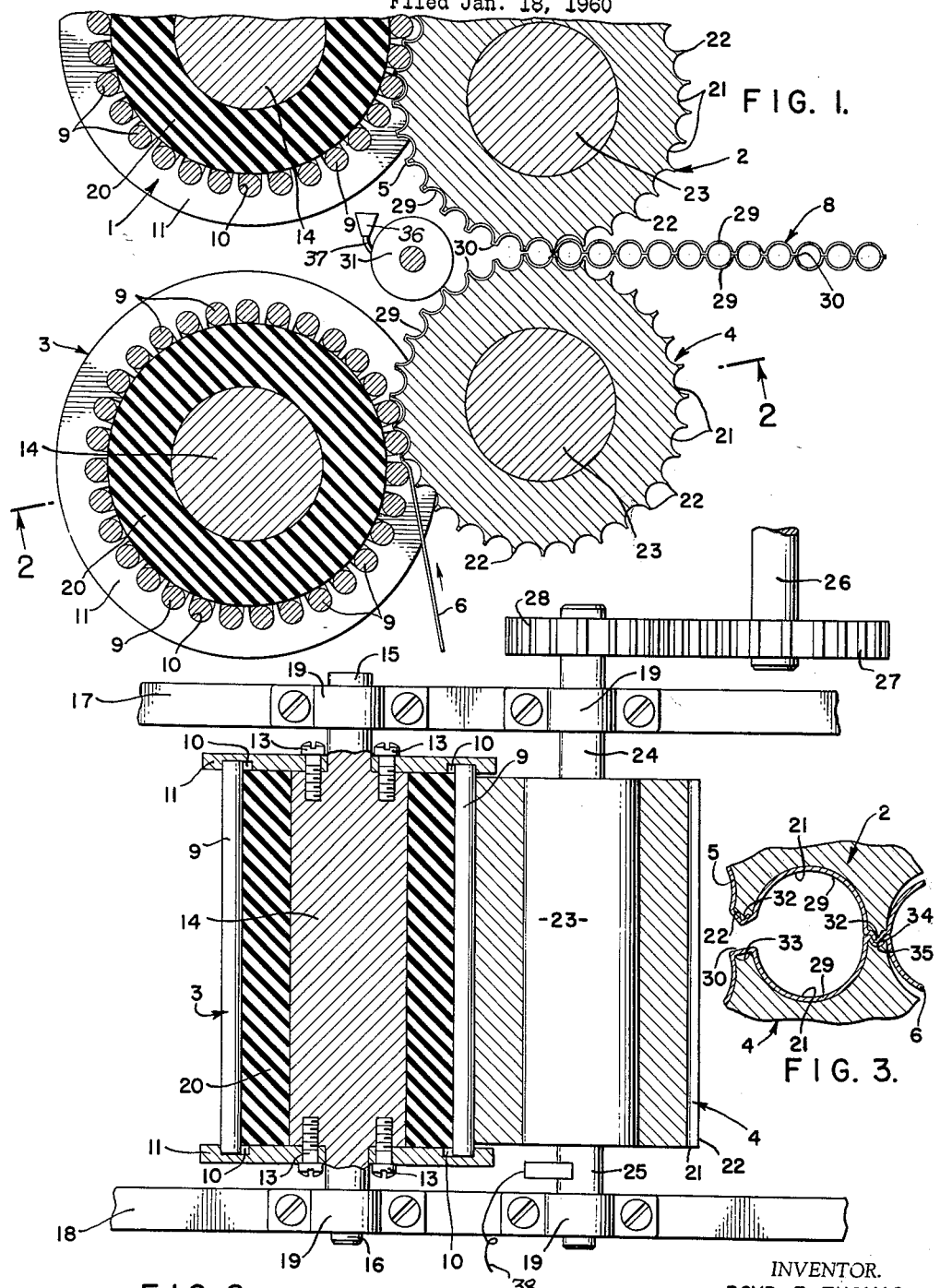

3,091,836
APPARATUS FOR FORMING SHEET METAL
Boyd F. Thomas, Pasadena, Calif., assignor to Young Spring & Wire Corporation, Detroit, Mich., a corporation of Michigan
Filed Jan. 18, 1960, Ser. No. 2,972
17 Claims. (Cl. 29—33)

This invention relates to apparatus for forming sheet metal and more particularly to apparatus for shaping continuous sheets or strips of thin metal or foil simultaneously and securing them together to form a continuous honeycomb core for use in making a sandwich core type structure.

The apparatus described herein is usable for accomplishing the method and making the product described in applicant's co-pending application Serial No. 3,097, filed January 18, 1960, for Method for Making Honeycomb Core and Product.

With the increasing demand for lightweight skin structures in aircraft and in missiles there has been a great amount of development relative to sandwich type skin structures having honeycomb metal cores. One of the problems relating to honeycomb cores has been the extremely high cost of production and, accordingly, the present invention is directed to an apparatus capable of making honeycomb core structures at reduced cost, faster and with high accuracy.

The apparatus for forming sheets used in honeycomb cores has been greatly simplified by the present invention. Precision ground cooperating rollers formed with complementary die surfaces have been used in the past to form each of the cooperating strips or sheets of a honeycomb core but have been subject to the rigid requirement of accurate alignment. Their effective lives have been shortened by wear which has been important because of the additional requirement of accuracy in the mating surfaces.

In the cooperating rollers constructed in accordance with the present invention, the roller with the re-entrant or recessed surface, which may be called the female roller, may be constructed as before. Its cooperating roller with the protruding die surfaces, which roller may be called the male roller, is constructed differently, and has a multiplicity of circumferentially spaced axially extending accurately-shaped rods of desired cross-sectional configuration each of which is resiliently supported radially for meshing with the female roller.

The use of individual replaceable rods greatly reduces the cost of making the male roller member for the need of accuracy in one large complicated integral unit is eliminated. The rods are fitted in slightly oversized holes in flanges on the ends of the roller so that any radially inwardly directed pressure will force them into contact with their resilient supporting means. The resilient means maintains the pressure between the two mating rollers without danger that the metal being formed will be damaged or sheared off because of a slight eccentricity or mismatch between the protrusions and the re-entrant portions of the two rollers.

Two strips or sheets of metal after passing through the rollers are brought into a pressure contact with each other, as between the rollers having the re-entrant portions, where they may be secured together by welding, adhesives, brazing or tacking.

Accordingly, a primary object of the invention is to provide an improved apparatus for forming sheet metal.

A principal object of the present invention is to provide apparatus for forming a corrugated strip or sheet and connecting these into a honeycomb core.

Another object of the invention is to provide metal shaping and connecting apparatus embodying rollers including self-aligning resiliently mounted die elements which are adapted to compensate for misalignment and inaccuracies.

A still further object of the invention is to provide a machine for corrugating paired flat strips or sheets of thin metal and connecting these permanently into a honeycomb core of parallel transverse tubes.

Another object of the invention is the provision of a metal forming machine in which at least one of the cooperating forming rollers has accurately made shaping elements resiliently supported for movement against rigid shaping elements.

These and other more specific objects will appear upon reading the following specification and claims and upon considering in connection therewith the attached drawing to which they relate.

Referring now to the drawing in which a preferred embodiment of the invention is illustrated:

FIGURE 1 is a cross-sectional view through a preferred embodiment of the invention;

FIGURE 2 is a cross-sectional view taken along the line 2—2 of FIGURE 1; and

FIGURE 3 is a fragmentary sectional view showing the engagement of modified forming rollers provided with indenting means for tacking together two sheets of formed metal.

Referring again to the drawing, two sets of mating rollers 1, 2 and 3, 4 are shown in engagement to form or shape continuous sheets of metal 5 and 6, respectively, which, after being formed, are brought into contact with each other between rollers 2 and 4 to be joined into a single core element or member 8. Each of the rollers 1 and 3 have axially-directed circumferentially spaced protrusions formed on their exterior surfaces by rods 9 which may be cylindrical, hexagonal, elliptical or of some other cross-sectional shape. The rods are secured in the rollers in slightly oversized wells 10 in end flanges 11 which are removably secured by screws 13 to the ends of a central core portion 14. Extending from the opposite ends of core 14, and through the flanges 11, are the shafts 15 and 16 mounted for rotation in bearings 19 carried by frame members 17 and 18, respectively. Encircling each core 14 and underlying the rods 9 is a resilient cylinder or sleeve 20 of rubber or other resilient material. The relationship is such that the rods 9 are urged resiliently to their outermost radial positions as permitted by the wells 10, and, as the rollers 1 and 3 roll in abutting contact with their cooperating rollers 2 and 4, respectively, the resilient sleeves enable the rods to engage their seating surfaces correcting and compensating for any inaccuracy or misalignment.

The rollers 2 and 4 have flat spacing surfaces 22 between axially directed, elongated re-entrant portions or grooves 21 of semicircular cross-section, each re-entrant portion being complementary to a mating protrusion 9. It will be understood that flat surfaces 22 extend from end to end of rolls 2 and 4 and have a width equal to the distance between the edges of adjacent grooves 21. These rollers are fixedly mounted on spaced core members 23 at the opposite ends of which shafts 24 and 25 are mounted for rotation in bearings 19 on frame members 17 and 18, respectively. The rollers 2 and 4 are driven at synchronous speeds by a motor or other driving means, not shown, connected in each instance to a drive shaft 26 which in turn is connected to the roller shaft through gears 27 and 28. Rollers 1 and 3 are driven by the engagement of their rods 9 with the mating surface of the rollers 2 and 4, respectively.

After the thin metal sheets 5 and 6 are placed between the mating rollers 1, 2 and 3, 4, respectively, the rotation of the rollers 2 and 4 causes the metal to be continuously fed through the space between each two mating rollers where it is formed as it is forced by successive rods 9 into corresponding complementary re-entrant female die structures 21, as shown in FIGURE 1. The formed sheets, having semicircular surfaces 29 spaced by flat surfaces 30, remain in the re-entrant portions 21 and on the flat surfaces 22 effective to form surfaces 30, respectively, as the rollers 2 and 4 rotate to continue to draw the unformed metal between the mating rollers.

As the rods 9 in each of rollers 1 and 3 are radially displaceable in the wells 10 in the flanges 11 and are resiliently supported by the sleeve 20, each is automatically adjustable to fit perfectly into a corresponding re-entrant portion 21 in the mating roller and is movable relative to the other rods. Accordingly, it is not necessary that the rollers in the present invention be made with the same precision or retained with the same accuracy of alignment as in earlier machines in which the male die members are immovable with respect to each other and to the re-entrant portions.

Another advantage of having the rods as individual members rather than as integral parts of a solid roller is that the rods and flanges can be removed and replaced with other rods and flanges of different sizes and contours in order to form metal of different thicknesses.

Rollers 2 and 4 are aligned and spaced so that they cause the opposing, spaced, flat surfaces 30 of sheets 5 and 6, formed on the substantially flat spacers 22 between the re-entrant portions 21 of the rollers, to be brought into pressure contact with each other at which time they may be permanently secured together by welding, adhesives, brazing or by tacking to form the core element 8. The two sheets 5 and 6 may be spot welded together at any number of the contacting flat surfaces 30 by an intermittent or continuous welding current supplied to the two metal rollers 2 and 4 by a pair of electrical leads, one of which is indicated at 38 in FIGURE 2, bearing against shaft 25 of roller 4. The other identical lead is not shown but will be understood as bearing against shaft 23 of roller 2 in the same manner as lead 38.

If it is desired that the core member 8 be formed by the use of adhesives, or by brazing, adhesive or brazing compound may be applied by the roller 31 as it is rotated by formed metal 6 on the roller 4. One roller 31 suffices to apply the adhesive or brazing compound either to one sheet of the formed metal or to both sheets at the same time. The adhesive or brazing compound may be applied to applicator roll 31 in any suitable manner, such as by a conventional doctor roll operating partially submerged in a supply trough for the adhesive or brazing compound, or by a supply reservoir 36 having a long narrow outlet 37 in light contact with the surface of roller 31.

When it is desired that the formed sheets 5 and 6 are to be joined by tacking, one of the rollers, 2 or 4, the roller 2 as shown in FIGURE 3, is constructed to have axially and circumferentially spaced pointed projections 32 extending radially outwardly from its flat surfaces 22 between its re-entrant portions 21. The other roller 4 has mating wells 33 in its flat surfaces 22 corresponding to the projections 32 on the roller 2 and when the opposing flat surfaces 30 of the formed metal are brought together, the projections 32 are forced into both sheets of metal and into wells 33, forming projections 34 on sheet 5 in matching indentations 35 in sheet 6 to tack the two sheets together. Tacking in this manner, adjacent each end of each pair of opposing flat surfaces 30, secures the sheet together for certain purposes and where additional holding force is required, the sheets may be projection-welded later at the mating projections and indentations.

If brazing is employed to secure the sheets 5 and 6 together, it will be desirable that conveyor means be provided to support the core 8 while it is heated sufficiently to join the two pieces of metal.

The continuous honeycomb core 8 upon leaving the rollers 2 and 4 is a unitary element and is further processed into a honeycomb sandwich structure by known manufacturing technique. Immediately upon leaving rollers 2 and 4, however, the element 8 may be wrapped around a carrying drum for purposes of transportation, or may pass directly to the next stage of manufacture.

The present invention greatly increases the production capacity in the forming of the individual metal sheets and in the making of honeycomb core elements because of the ease with which the metal is moved and formed in the rollers. In addition, the production costs are reduced because the forming rollers made according to the invention do not damage the material and have increased life.

While the particular apparatus for making honeycomb cores herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A core forming apparatus comprising a first set of mating rollers mounted on a frame, one of said first set of rollers having first re-entrant portions, the other of said first set of rollers having first protrusions complementary to said first re-entrant portions, each of said first protrusions being adapted to extend into and engage a corresponding first re-entrant portion so that when said one roller of said first set is rotated it will drive said other roller of said first set, each of said first protrusions and said first re-entrant portions when engaged being adapted to receive a first metal sheet therebetween to be formed, means to drive said one of said rollers, a second set of mating rollers mounted on a frame, one of said second set of rollers having second re-entrant portions, the other of said second set having second protrusions complementary to said second re-entrant portions, each of said second protrusions being adapted to extend into and engage a corresponding second re-entrant portion so that when said one roller of said second set is rotated it will drive said other roller of said second set, each of said second protrusions and said second re-entrant portions when engaged being spaced to receive a second metal sheet therebetween to be formed, and means to drive said one of said second set of rollers, the said one roller in said sets being spaced from each other to receive and force together said first and second formed metal sheets in pressure contact.

2. The invention according to claim 1 in which said protrusions extending from said other of said rollers in both sets are formed by axially directed, spaced rods extending along the surface thereof.

3. The invention according to claim 2 in which said re-entrant portions on said rollers are axially-directed and circumferentially spaced with alternate flat portions so that said metal sheets are formed to have spaced re-entrant portions and alternately spaced substantially flat portions.

4. The invention according to claim 3 in which said one roller in said both sets has means thereon to secure said two sheets together between said contacting flat portions when said flat portions on said one roller and said two sheets are brought into said pressure contact with each other.

5. The invention according to claim 4 in which said one roller of both sets includes as part thereof spot welding means by which certain of said flat portions of said both sheets are welded together when said flat portions of said sheets and of said one rollers are brought into said pressure contact with each other.

6. The invention according to claim 3 including means to apply an adhesive to the said flat portions of at least one of said sheets of metal for securing said sheets together upon the juxtaposed flat portions thereof being brought into said pressure contact with each other.

7. The invention according to claim 4 in which one of said one rollers has said spaced projections on its flat portions and the other of said one rollers has corresponding wells in its flat portions to receive said projections when said one rollers are rotated, said projections being adapted to indent said two sheets of metal and cause them to be secured together.

8. The invention according to claim 2 in which said rods are cylindrical and in which said re-entrant portions are substantially semicircular in section.

9. The invention according to claim 2 in which resilient means are secured on said other rollers radially inwardly of said rods, said rods being supportable by said resilient material.

10. A metal forming apparatus comprising a pair of mating rollers mounted on a frame, one of said rollers having circumferentially spaced re-entrant portions, the other of said rollers having circumferentially spaced protrusions complementary to said re-entrant portions, each of said protrusions being adapted to extend into and engage a coresponding re-entrant portion so that when said one roller is rotated it will drive said other roller, each of said protrusions and said re-entrant portions when engaged being adapted to receive a metal sheet to be formed therebetween, and means to drive said one of said rollers.

11. The invention according to claim 10 in which said protrusions on said other roller are formed by axially-directed spaced rods.

12. The invention according to claim 11 in which said re-entrant portions are circumferentially spaced with alternate flat portions.

13. The invention according to claim 11 in which said rods on said other roller are radially displaceable, and a sleeve of resilient material underlies said rods to urge them radially outwardly.

14. The invention according to claim 13 in which said rods are cylindrical and in which said re-entrant portions are substantially semicircular in section.

15. In a metal forming apparatus, a forming roller, said roller having circumferentially spaced protrusions, said protrusions being formed by spaced rods.

16. The invention according to claim 15 in which said rods are radially displaceable and a sleeve of resilient material underlies said rods to urge them radially outwardly.

17. The invention according to claim 16 in which said rods are cylindrical and are axially-directed.

References Cited in the file of this patent

UNITED STATES PATENTS

| | | |
|---|---|---|
| 626,183 | Martin | May 30, 1899 |
| 1,732,450 | Vance | Oct. 22, 1929 |
| 2,508,489 | Browne | May 23, 1958 |

FOREIGN PATENTS

| | | |
|---|---|---|
| 81,284 | Germany | May 6, 1894 |